INVENTOR.
MASAHISA MIYAGI
By
OSTROLENK, FABER, GERB & SOFFEN
ATTORNEYS

INVENTOR.
MASAHISA MIYAGI
BY
OSTROLENK, FABER, GERB & SOFFEN
ATTORNEYS

INVENTOR.
MASAHISA MIYAGI
BY
OSTROLENK, FABER, GERB & SOFFEN
ATTORNEYS 3,444,469
VARIABLE-EMPHASIS COMMUNICATIONS SYSTEM OF THE FREQUENCY OR PHASE-MODULATION TYPE
Masahisa Miyagi, Tokyo, Japan, assignor to Nippon Electric Company Limited, Tokyo, Japan, a corporation of Japan
Filed Apr. 13, 1966, Ser. No. 542,301
Claims priority, application Japan, Apr. 16, 1965, 40/22,492
Int. Cl. *1/62, 1/10*
U.S. Cl. 325—46 7 Claims

ABSTRACT OF THE DISCLOSURE

A communications system employing variable emphasis circuits with both receiver and transmitter facilities to obtain the most advantageous compromise between signals and noise ratio and signals and distortion ratio, wherein both ratios are vastly improved to improve the overall transmission quality. The transmitter emphasis circuit is automatically adjusted in accordance with the information signal level of signals derived from an information signal source. A pilot signal source of invariant amplitude is applied to the transmitter emphasis circuit whose output frequency modulates the carrier. The pilot signal lies in the higher frequency region. The variable de-emphasis circuit provided in the receiver facility is automatically adjusted by the output of a comparator circuit which compares the level of the pilot signals components of the receive signal against a local reference signal source.

The instant invention relates to communications systems and more particularly is concerned with means for effectively utilizing the transmission band of a communication system and with providing a marked improvement in transmission characteristics for systems applications where the noise level has a significant effect upon the desired quality of the received and demodulated signal of the frequency modulated (or phase-modulated) wave and further, wherein the effective degree of modulation varies with time variation of the information signal.

The instant invention employs a variable-emphasis frequency-modulation (or phase-modulation) system having excellent signal-to-noise ratio and distortion characteristics, wherein the transmitter comprises a variable-emphasis circuit controlled by the information signal level or amplitude and an A.C. pilot signal source for producing a pilot signal whose level is invariant with time and which output is transmitted with the information signal. The communication system receiver comprises means for detecting the level of the received pilot signal and a de-emphasis circuit which is complementary to the transmitter-side pre-emphasis circuit and is controlled by the detected pilot signal level so as to maintain the pilot signal level substantially constant.

Present technology has advanced to the point wherein fixed emphasis circuits have been employed to improve transmission characteristics of frequency-modulated (or phase-modulated) waves. It should, however, be noted that the effective degree of modulation will vary with time for some information signals. For instance, the information signal experiences variation with time in a single speech channel and introduces variation into the effective degree of modulation.

For transmission of the frequency-modulated (or phase-modulated) wave, the higher degree of modulation generally determines the transmission band width. The band width is, therefore, ineffectively used during those time intervals containing lower degrees of modulation. Various approaches have been taken to raise the transmission efficiency of such a transmission system. For example, the transmission efficiency may be raised by suppressing the time variation of the modulation degree by means of compandors which compress the larger amplitude components on the transmitter side and expand such compressed components on the receiver side. The operation of such compandors is described in the ITT Communications Handbook for Engineers, on page 538. This approach, however, has been found to be ineffective for the reason that the waveform distortion introduced by the instantaneous compandors augments the higher-harmonic components and thus widens the transmission band width. It therefore has become a matter of urgent importance to provide a transmission system having the best possible signal-to-noise ratio and distortion characteristics and which operates in the narrowest possible transmission band.

The instant invention provides, with a view to achieving the above requirements, a frequency-modulation (or phase-modulation) transmission system for use in applications wherein the effective degree of modulation varies with the time variation of the information signal and wherein the transmitter comprises a pilot signal source whose output level is invariant with time and which is transmitted together with the information signal. Means are provided for detecting the level of the information signal modulation input and an emphasis circuit whose frequency characteristics are controlled by the output of the detecting means operates to augment the higher frequency components of the information signal when the input level is low and operates to reduce the higher frequency components where the input level is high. The receiver comprises means for detecting the level of the received pilot signal, and a receiver emphasis circuit whose frequency characteristics are corrected by the output of the receiver detecting means in complementary relationship to the frequency characteristics of the transmitter-side emphasis circuit so as to keep the received pilot signal level substantially constant. Thus, by appropriate electronic emphasis of the signals it becomes possible to shrink the operating band width by an appreciable amount, while at the same time providing significant improvement in the overall signal-to-noise ratio.

It is therefore one object of the instant invention to provide a communications system employing variable-emphasis circuitry for the purpose of providing operation with excellent signal-to-noise characteristics over a substantially narrow band width.

Another object of the instant invention is to provide a novel communications system of either the frequency-modulation or phase-modulation type and which employs variable emphasis-circuits to enable transmission of excellent signal-to-noise ratio characteristic to take place over a substantially compressed operating frequency band width.

Still another object of the instant invention is to provide a communications system of the frequency-modulation type in which transmission over a compressed band width is achieved through the provision of a variable emphasis circuit for compressing or increasing frequency deviation of the carrier according to whether the information signal level is high or low respectively, and providing a complementary emphasis circuit at the receiver for acting upon received demodulated signals in a complementary fashion to restore original signal levels.

Still another object of the instant invention is to provide a communications system of the frequency-modulation type in which transmission over a compressed band width is achieved through the provision of a variable emphasis circuit for compressing or increasing frequency deviation of the carrier according to whether the information signal level is high or low respectively, and providing a complementary emphasis circuit at the receiver for acting upon received demodulated signals in a complementary fashion to restore original signal levels and wherein the transmitter is further comprised of a pilot signal source for transmitting an invariant level signal which is sensed by a signal level detector at the receiver facility in order to control the receiver deemphasis circuit to maintain the pilot signal at its constant level thereby resulting in accurate complementary deemphasis of received signals.

These and other objects of the instant invention will become apparent when reading the accompanying description and drawings in which.

FIGURES *5a* and *5b* are schematic diagrams showing emphasis-circuits which may be employed in the instant invention;

FIGURES *6a* and *6b* are plots of curves showing the performance of the variable-emphasis circuits of the instant invention.

Figure 1:
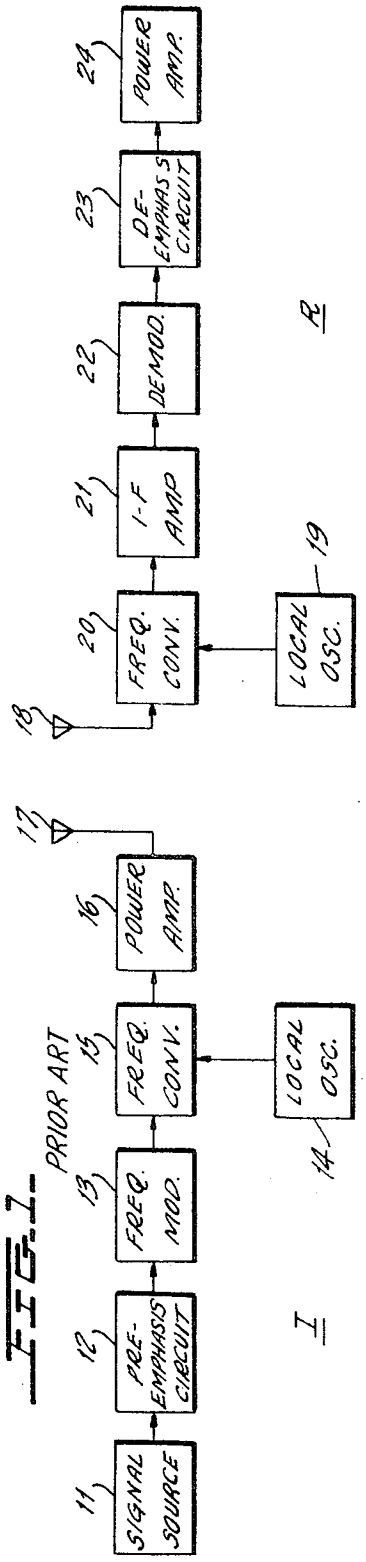
FIGURE 1 is a block diagram showing a transmitter and a receiver of the frequency-modulation type which employs conventional fixed emphasis-circuitry.

Referring now to the drawings, FIGURE 1 shows a transmitter T and a receiver R for use in a communications system of the frequency-modulation type and which system employs conventional fixed emphasis circuits. The transmitter T of FIGURE 1 is comprised of an information signal source 11, a pre-emphasis circuit 12, a frequency-modulator 13, transmitter local oscillator 14, a transmission frequency converter 15, a power amplifier 16 and a transmitting antenna 17. The receiver R is comprised of receiving antenna 18, frequency-converter 20, local oscillator 19, intermediate-frequency (IF) amplifier 21, demodulator 22, deemphasis circuit 23 and a demodulated information power amplifier 24.

In operation, the signal source 11 has its output impressed upon emphasis circuit 12 which augments the higher frequency components of the information signal. The signals so treated are impressed upon frequency-modulator 13 which causes the modulating signal to be mixed in frequency-converter 15 with local oscillator 14 which operates at the carrier frequency. The modulator carrier is applied to power amplifier 16 and is, in turn, transmitted by antenna 17.

On the receiver side, the incoming signal is stepped down in frequency by beating the output of local oscillator 19 with the incoming signal and frequency converter 20. The stepped down frequency signal is amplified in IF amplifier 21 and is demodulated in demodulator circuit 22. The deemphasis circuit 23 acts to deemphasize the higher frequency components before passing the incoming audio signal to power amplifier 24 which may, for example, be coupled to a suitable speaker means (not shown).

Frequency modulated waves have triangular-shaped noise versus frequency characteristics, which fact is well known in the art. It therefore becomes possible to improve the signal-to-noise ratio by means of the preemphasis circuit 12 of FIGURE 1 for augmenting the higher frequency components of the information signal and providing a deemphasis circuit 23 provided on the receiver side. This modulation technique, however, results in an increase of the undesired frequency-shift occurring at higher frequencies of the information signal, thus increasing the operating frequency band. This means that there is an optimum degree of modulation when the problem of distortion is taken into consideration and this is the reason why it is often preferred to employ a transmission system having characteristics midway between phase and frequency-modulation techniques.

Figure 2:
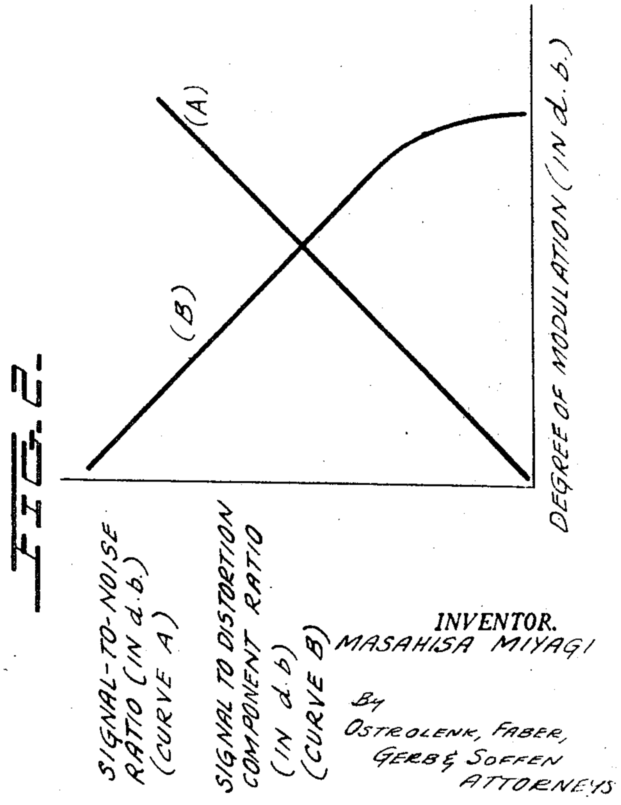
FIGURE 2 is a plot of curves illustrating an example of the thermal-noise and the distortion characteristics versus the degree of modulation of a conventional frequency-modulation transmission system.

FIGURE 2 diagrammatically illustrates an example of the thermal noise and the distortion characteristics versus the degree of modulation in a conventional frequency-modulation transmission system. The abscissa of the plot shown in FIGURE 2 shows the degree of modulation in db, while the ordinate show in db, the signal-to-noise ratio for curve A and the signal-to-distortion component ratio for curve B. From a consideration of these curves, it can clearly be seen that the noise component is dominant (i.e., quite large) for small degrees of modulation, while the distortion component is dominant for larger degrees of modulation. It therefore follows that there must be an optimum degree of modulation when both the noise component and the distortion component characteristics are adequately taken into account. When the level of information signal varies with respect to time, the system does not always operate at this optimum degree of modulation and therefore, the dominant factor effecting the performance of the system is at times the noise component and at times the distortion component.

Figure 3:
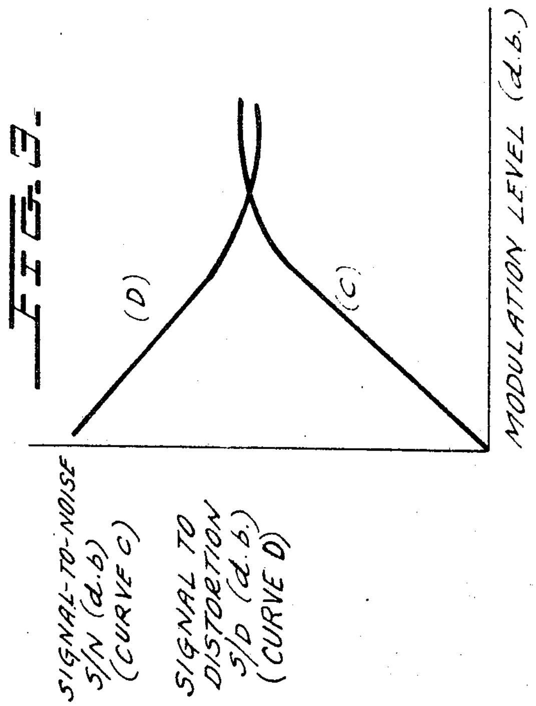
FIGURE 3 is a plot of curves showing an example of the thermal-noise and the distortion characteristics versus the modulation degree for a variable-emphasis frequency-modulation or phase-modulation transmission system of the type described in the instant invention.

FIGURE 3 diagrammatically shows an example of the thermal noise and the distortion characteristics plotted against the degree of modulation of a variable emphasis frequency-modulation (or phase-modulation) transmission system designed in accordance with the principles of the instant invention. The degree of modulation is plotted along the abscissa while the signal-to-noise ratio for curve C and the signal-to-distortion component ratio for curve D is plotted along the ordinate. If, for greater degrees of modulation, the higher frequency components are reduced during transmission and are augmented during demodulation, the larger frequency shift occurring in the conventional system of FIGURE 1 is suppressed so as to prevent an increase in the degree of modulation from appreciably deteriorating the signal-to-distortion component characteristics D. In this case, the signal-to-noise ratio is not greatly improved, but a satisfactory compromise is nevertheless reached. Thus, it becomes possible to improve, with the frequency bandwidth unaltered, the transmission characteristics through raising the degree of modulation at the lower frequencies and reducing the band-width required for transmission while maintaining the transmission characteristics unchanged. From a consideration of FIGURE 3 it can therefore be seen that the signal-to-distortion ratio in db substantially levels off as the modulation level increases, as shown by curve D. The resulting compromise of signal-to-noise ratio likewise leveling off, as shown by curve C, which compromise is most satisfactory since a reduction in the band width can be achieved, and a satisfactory signal-to-noise ratio is also achieved. Thus, while the signal level of the modulating signal may vary with respect to time, the system operation can be maintained within the curved portions of curves C and D so as to yield vastly improved operating characteristics.

Figure 4:
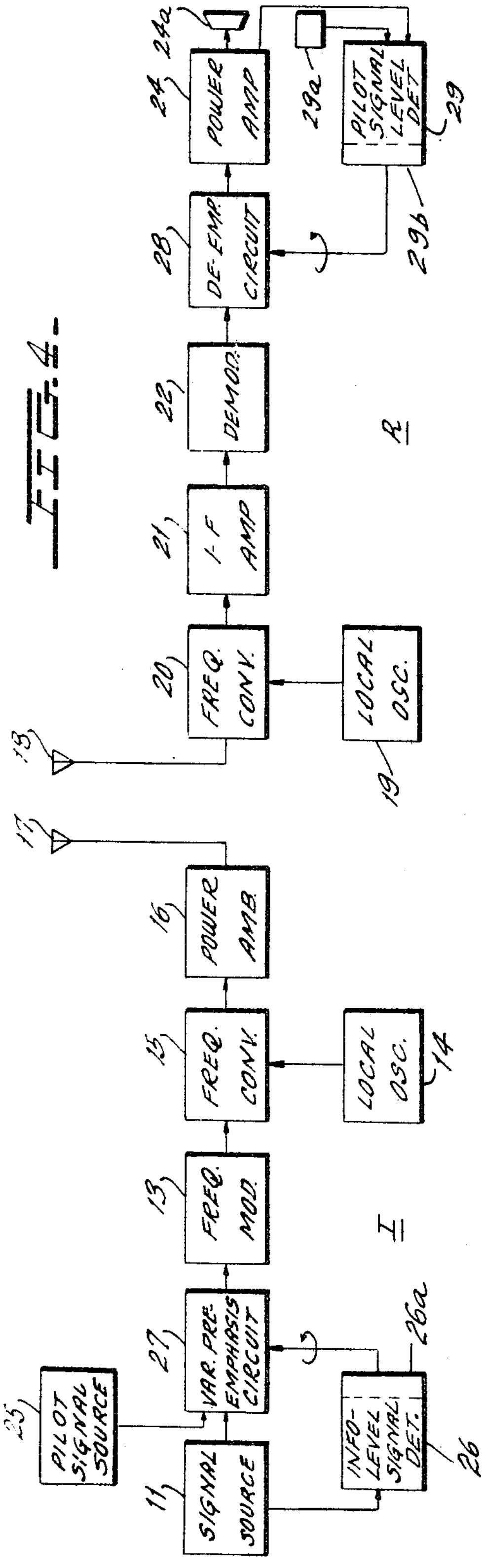
FIGURE 4 is a schematic diagram showing a communications system of the frequency-modulation type which employs the variable-emphasis circuitry characterized by the instant invention.

FIGURE 4 schematically illustrates an embodiment of a communications system designed in accordance with the principles of the instant invention wherein like elements, as between FIGURES 1 and 4, are designated with like numerals. The transmitter T of FIGURE 4, in addition to employing certain similar components to that shown in transmitter T of FIGURE 1, is further comprised of pilot signal source 25, information signal level detector 26 and variable preemphasis circuit 27.

The receiver R of FIGURE 4, in addition to employing components similar to the receiver R of FIGURE 1, further comprises a variable deemphasis circuit 28 and a pilot signal level detector 29.

By operating upon the higher frequency components of the frequency-modulated waves to be transmitted so as to augment the signals of lower input information signal level, it is possible to improve the signal-to-noise ratio as is apparent from the noise versus frequency characteristics. For example, in FIGURE 2, by increasing the modulation degree, the signal-to-noise ratio, as shown by curve A, increases. In such cases the deemphasis circuit must be controlled on the receiver side with reference to the results of detection of the level of pilot signal added to the transmitted signal in the higher frequency region.

If the higher frequency components are not reduced for higher input information signal level, the extension of the frequency band width necessary for transmission will result. By reducing these components it is possible to reduce the distortion components, as is apparent from comparison of FIGURE 2 with FIGURE 3 and thereby an improvement in the overall thermal noise and distortion component characteristics will result.

Figure 5A:
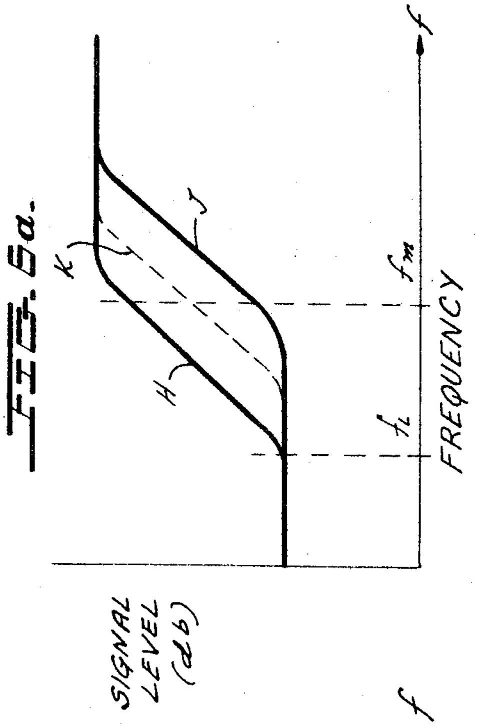
Figure 5B:
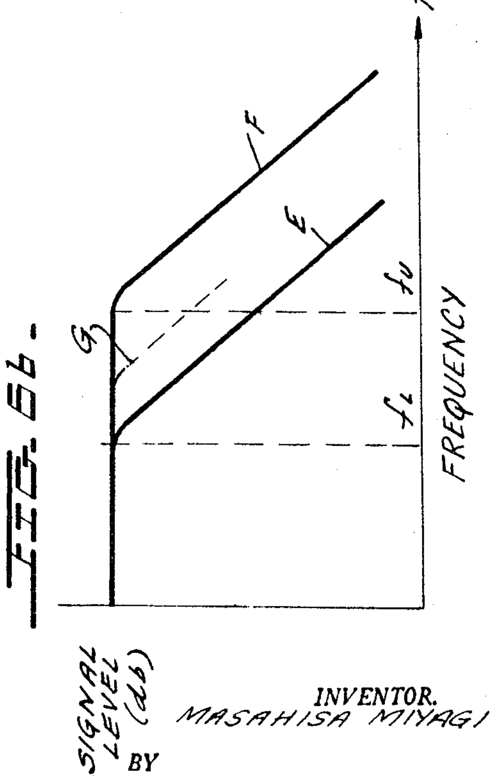
Figure 5A:
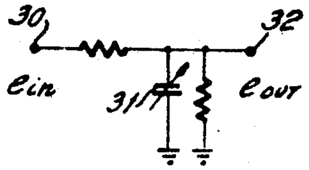
Figure 5B:
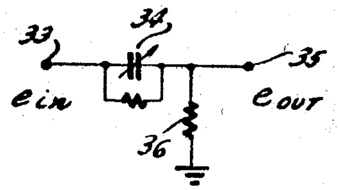

Making reference to FIGURES 5*a* and 5*b*, there are shown therein examples of emphasis circuits. FIGURE 5*a* shows a pre-emphasis circuit. If an input signal $e_{in}$ is impressed upon input terminal 33, an output signal $e_{out}$ will appear at output terminal 35, whose amplitude will increase for increasing frequency of the input signal as a result of the capacitive element 34, whose impedance decreases with increasing frequency of the input signal, so as to cause an increasingly larger portion of the output signal to appear across shunt resistor 36. FIGURE 5*b* shows a de-emphaiss circuit wherein the reverse operation results. For example, if a signal $e_{in}$ is impressed upon input terminal 30, an output signal $e_{out}$ will appear at output terminal 32, which output signal will be diminished in amplitude relative to the input signal as the input signal increases in frequency. This is obvious from a consideration of the capacitor 31 which is a variable reactance element whose impedance decreases with increasing frequency.

It is possible to vary the frequency characteristics of the pre-emphasis circuits in response to the information signal level by controlling the capacitance value of the capacitors with the information signal level. This result is obtained by the information level signal detector 26 which comprises an envelope detector to average or smooth the output of signal source 11. The output of the detector 26 is then employed to vary the capacitance of adjustable capacitor 31 (or 34) shown in the emphasis circuits. This may be performed by providing suitable servo control means coupled to the output of the information level signal detector to vary the capacitance of the capacitor elements.

The control of the capacitor elements is performed in such a fashion that the capacitance is increased with decrease in the information signal level to emphasize a high frequency component, and that the capacitance is decreased with increase in the information signal level to reduce the emphasis degree of the high frequency component. It will be obvious that the complementary deemphasis operation is performed at the receiver end.

The operation of the variable emphasis communications system of FIGURE 4 is as follows:

At the transmitter the signal source 11 has its output impressed upon the input of variable preemphasis circuit 27 and upon the input of information level signal detector 26. A pilot signal source 25 provides a constant A.C. output which is also applied to the input of variable preemphasis circuit 27. The information level signal detector 26, which may be any suitable smoothing or averaging circuit, develops a smoothed output signal which is applied to suitable servo control means **26*a* for the purpose of automatically controlling the variable capacity element provided in preemphasis circuit 27**.

The preemphasis circuit 27, which may be of the type shown in FIGURE 5*a*, acts to increase the amplitude of the signal source output for increasing frequency through the employment of the information level signal detector 26 and its accompanying servo control means **26*a*. The amount of amplitude increase or decrease is altered in accordance with an increase or decrease in the smoothed output of information level signal detector 26**.

The output of pre-emphasis circuit 27 is then applied to frequency modulator 13 to perform modulation in the same manner as previously described with reference to components 13–17 in the transmitter of FIGURE 1.

The receiver R operates in the same manner as that described in FIGURE 1 up to and including the demodulator stage 22. The demodulator output, however, is impressed upon a variable deemphasis circuit 28 which may be of the type shown in FIGURE 5*b* so as to decrease the amplitude of the demodultaed signal as it increases in frequency (just the reverse of the preemphasis circuit 27 of transmitter T). The output of variable deemphasis circuit 28 is applied to power amplifier 24 which simultaneously feeds suitable speaker means **24*a* and pilot signal level detector 29. The pilot signal level detector 29 selectively envelope detects the pilot signal component of the output of power amplifier 24 and smooths or averages it in the same manner as the information level signal detector 26. The resulting smoothed or averaged output is then compared against a pilot signal from reference signal source 29*a*, which pilot signal has the same level as the pilot signal source 25 of transmitter T. A comparison of these two voltage levels is performed in level detector 29 in order to control the operation of a servo control means 29*b* which operates to automatically adjust the variable capacitor in the deemphasis circuit so as to adjust the averaged pilot signal output of power amplifier 24 to be substantially the same level as the output of the reference signal source 29*a***. The de-emphasis circuit is thus given a complementary characteristic to the pre-emphasis circuit of the transmitter side.

FIGURES 6*a* and 6*b* diagrammatically show examples of performance of the variable emphasis circuits.

FIGURE 6*a* is a plot showing the variation in signal level versus frequency for a pre-emphasis circuit of the type shown in FIGURE 5*a* wherein the ordinate shows the signal level output signal of the emphasis circuit which varies with increasing frequency. Curve H, which represents the larger capacitance value shows an increase in amplitude of the modulating signal as it increases in frequency. Curve J, on the other hand, which represents a smaller capacitance of capacitor 34, shows that a substantially flat characteristic is obtainable between the lowest frequency $F_l$ of the information signal and the highest frequency $F_u$ thereof. By providing adjustment over the entire range, it becomes obvious that intermediate characteristics, such as those shown by the dotted-line curve K are also achievable. Thus, it becomes possible to not only increase the amplitude of the modulating signal for increases in frequency, but also to vary the amount of increase by means of the information level signal detector circuits and servo control means, previously described.

FIGURE 6*b* is a plot for a variable de-emphasis circuit of the type shown in FIGURE 5*b* wherein the capacity of capacitor element 31 is varied and wherein the ordinate shows the signal level of the input signal for the emphasis circuit for increasing frequency. Curve E, for a larger capacity value, shows the reduction of the higher frequency components between the upper and lower limits of the operating frequency band $F_u$ and $F_l$ respectively. Curve F, for the smaller value of capacitance, shows that it is possible to provide a substantially flat characteristic over a range between the lowest frequency $F_l$ of the information signal and the highest frequency $F_u$ thereof. Hence, it can be seen that the capacity of the capacitor can be varied so as to produce no reduction in amplitude of the modulating signal as it increases in frequency as exemplified by curve F. By increasing the capacity of the capacitor, a reduction in amplitude of the modulating for increase in frequency can be obtained over the entire operating band, as evidenced by curve E. It is obvious that it is possible to provide intermediate characteristic, as evidenced by the dotted line curve G. Actually, adjustment over the entire operating frequency band is automatic, depending only upon the output level of the pilot signal level detector 29.

The curve H of FIGURE 6*a* and the curve E of FIGURE 6*b* have mutually complementary characteristics. Consequently, a pairing of such characteristics may be accomplished in the same overall frequency characteristics as will the coupling of the characteristic shown by curve J of FIGURE 6*a* with that of curve F of FIGURE 6*b*. Thus, the variable emphasis circuits can be coupled in this manner to maintain the frequency characteristics substantially unchanged, regardless of the variation of the level of the information signal.

While the instant invention has been described herein as exemplified by a frequency-modulation transmission system employing variable emphasis circuitry, it is obvious to those with ordinary skill in the art to adapt a phase-modulation transmission system with variable-emphasis circuits so as to provide behavior similar to that described hereinabove.

Providing communication of excellent quality over the narrowest possible frequency band is quite important from the viewpoint of both prevention of cross-talk and the allocation of frequency bands. The narrowest possible transmission band width, with respect to the threshold level, is desirable in cases where the limitations are imposed upon the transmitted power. In connection with these requirements, the instant invention improves the performance of the transmission system. For example, control of the higher frequency components in the range from 1 kilocycle to 3.4 kilocycles, i.e., in the speech transmission range, enables the degree of modulation to be augmented by a factor of 3.4 at 1 kilocycle, if the frequency shift is kept unaltered and thereby makes it possible to improve the signal-to-noise ratio by a very significant amount.

While the instant invention has been explained chiefly in conjunction with an exemplary embodiment, it should clearly be understood that the description has been made only by way of example and that various modifications are possible within the scope and spirit of the invention. In the description, only those parts having direct connection with the invention have been explained and, for the sake of simplicity of description, the remaining components having small impact upon the descriptive material have not been described in detailed fashion. In this regard, it should also be appreciated that conventional constituents may further be added to the embodiments set forth herein. For example, auxiliary equipment such as speakers, microphones and other low or high frequency transmitting elements may be employed as the signal sources and output devices in the communications system described herein.

What is claimed is:

1. A transmitter for use in an angle modulated communications system comprising:

a source of information signals having a signal level which varies with respect to time;

a carrier frequency source;

means utilizing said information signals as a modulating signal for angle modulating the carrier frequency;

a variable emphasis circuit including a variable capacitor being coupled between said information signal source and said angle modulating means for changing the instantaneous signal level of said information signals as the information signal changes in frequency;

level detecting means for detecting the output level of said information signal source;

means coupled to the output of said level detecting means for automatically altering the frequency response characteristics of said variable emphasis circuit by controlling the capacitance of said variable capacitor when the output of said level detection means changes such that the frequency response of said variable emphasis circuit decreases with increases in the output and such that the frequency response of said variable emphasis circuit increases with decreases in the output of said level detecting means;

a pilot signal source coupled to said variable emphasis circuit for inserting a time invariant signal to the input of said variable emphasis circuit, which time invariant signal experiences changes in instantaneous signal level as a result of the operation of the variable emphasis circuit.

2. A receiver for use with the angle modulated communications systems transmitter of claim 1 in which a time invariant signal is added to the information signal before transmission, said receiver comprising, means for receiving said angle modulated signals;

means for demodulating said received angle modulated signals.

means for amplifying said demodulated signals;

a variable de-emphasis circuit coupled between said demodulating means and said amplifier means for changing the signal level of said demodulated signals with changes in frequency thereof in complementary fashion to said transmitter emphasis circuit;

said variable emphasis circuit including a variable capacitor;

a local reference signal source;

means coupled to said amplifying means and said local source for detecting the difference between the level of said local reference signal and the level of said time invariant signal;

said difference detecting means including means for adjusting the capacity of said variable capacitor to increase the high frequency response of said variable emphasis circuit when the difference is increasing and to decrease the high frequency response of said variable emphasis circuit when said difference is decreasing.

3. An angle-modulation signal transmission system wherein the modulation degree varies with the time variation of the level of an information signal to be transmitted as signal is derived from an information signal source, said system comprising:

a transmitter having a frequency modulator;

a variable emphasis circuit disposed between the source of said information signal and the frequency modulator for subjecting said information signal to variable emphasis in advance of frequency modulation;

means coupled to said information signal source for envelope-detecting and smoothing said information signal, a pilot signal source coupled to said variable emphasis circuit for supplying an A.C. pilot signal of a predetermined amplitude and frequency to said variable emphasis circuit, and means responsive to the outlet of said detecting and smoothing means for altering the frequency characteristics of said variable emphasis circuit;

a receiver having a demodulator;

a signal amplifier;

a variable de-emphasis circuit coupled between the demodulator and the signal amplifier for subjecting the demodulated signals to variable de-emphasis;

a reference signal source for providing a reference signal of a predetermined level substantially similar to the level of the pilot signal before it is applied to said variable emphasis circuit;

means for detecting the pilot signal components of said amplified demodulated signal and for smoothing the detected component;

means for detecting the level difference between said detective and smooth signal and said reference signal;

and means responsive to the result of said level difference detection for changing the frequency characteristics of said variable de-emphasis circuit.

4. The transmitter of claim 3 further comprising:

said information signal source being adapted to provide information signals having a signal level which varies with respect to time;

a carrier frequency source;

said modulator employing said information signals as a modulating signal for angle-modulating the carrier frequency.

5. The transmitter of claim 4 wherein said variable emphasis circiut is comprised of a variable capacitor;

said means for altering the frequency charactistics of said variable emphasis circuit being comprised of means for controlling a capacitance of said variable capacitor in response to said smooth output in such a manner that the high frequency response of said variable emphasis circuit may be decreased for increases in said smooth output and so that the high frequency response of said variable emphasis circuit may be increased for decreases in said smooth output.

6. The receiver of claim 3 wherein said variable emphasis circuit includes a variable capacitor and wherein said means for changing the frequency characteristics of said variable deemphasis circuit includes means for controlling the capacitance of said capacitor.

7. The transmission system of claim 3 wherein said frequency modulator includes means for modulating a carrier with said information signal which lie within a predetermined frequency range;

said pilot signal source including means for generating said pilot signals at a frequency near the upper end of said predetemined frequency range.

References Cited

UNITED STATES PATENTS

| | | | |
|---|---|---|---|
| 2,430,978 | 11/1947 | Foster | 332—20 |
| 2,397,157 | 3/1946 | Roberts | 325—46 |
| 2,410,489 | 11/1946 | Fitch | 325—46 |
| 2,924,703 | 2/1960 | Sichak | 325—31 |
| 3,268,815 | 8/1966 | Banach | 179—1.5 |
| 3,288,930 | 11/1966 | Johnson | 179—1 |

ROBERT L. GRIFFIN, *Primary Examiner.*

BENEDICT V. SAFOUREK, *Assistant Examiner.*

U.S. Cl. X.R.

325—65, 145; 332—18; 333—14